Oct. 8, 1929.  M. H. SHOENBERG ET AL  1,730,632

ILLUMINATING DEVICE

Filed July 25, 1927

INVENTORS:
Milton H. Shoenberg
BY Lester Schon
White, Prost+Fryer
ATTORNEYS.

UNITED STATES PATENT OFFICE

MILTON H. SHOENBERG AND LESTER SCHON, OF SAN FRANCISCO, CALIFORNIA; SAID SCHON ASSIGNOR TO SAID SHOENBERG

ILLUMINATING DEVICE

Application filed July 25, 1927. Serial No. 208,236.

This invention relates generally to devices for obtaining novel illuminating effects, and is particularly applicable for advertising and display purposes.

It is an object of this invention to devise novel means for securing color changes in the illumination of a lamp globe.

It is a further object of this invention to devise a novel display device incorporating an electric lamp globe which is caused to recurrently change its color of illumination.

It is a further object of this invention to devise a novel illuminating device which will utilize a pair of alternately energized lamps for effecting recurrent changes in the color of the illumination of one of the lamp globes.

Further objects of this invention will appear from the following description in which we have set forth the preferred embodiment of our invention. It is to be understood that the appended claims are to be accorded a range of equivalents consistent with the state of the prior art.

Referring to the drawing.

The invention may be outlined briefly as comprising an electrical lamp having a frosted globe, which is adapted to be directly illuminated by diffusing light projected from a camouflaged source. Means is provided for supplying current to the lamp filament at recurrent intervals so that the lamp globe is alternately illuminated by current applied to its filament, and by diffusing light received from the camouflaged source. The light projected into the globe is preferably of a color which contrasts with the usual whitish light of the lamp. The preferred embodiment of the invention utilizes a pair of electric lamps which are alternately energized by current at recurrent intervals, and light from one lamp is projected into the other lamp after filtering the same thru a color screen. When utilizing the invention in a display device, the advertising card or other device which is being displayed is arranged adjacent to one or both of the lamp globes.

Figure 1:
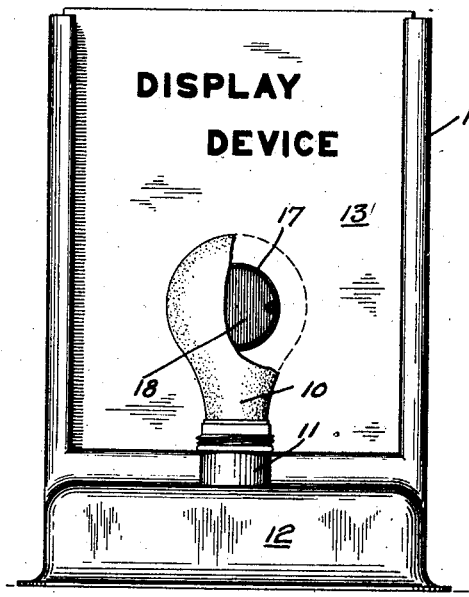
Figure 1 is a front elevational view illustrating the complete display device incorporating this invention.
Figure 2:
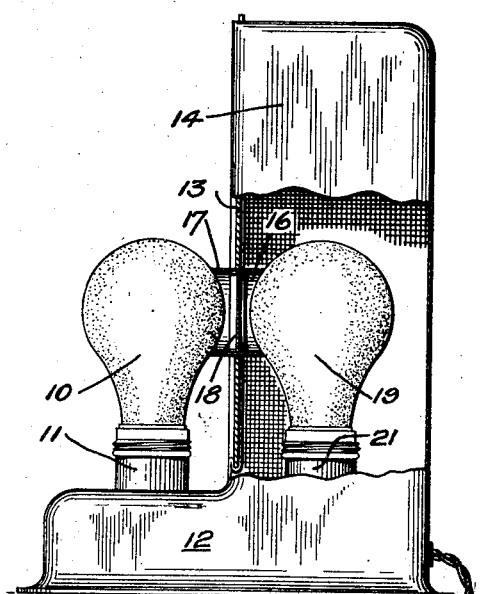
Fig. 2 is a side elevational view of the device shown in Fig. 1, a portion of the housing being broken away.
Figure 3:
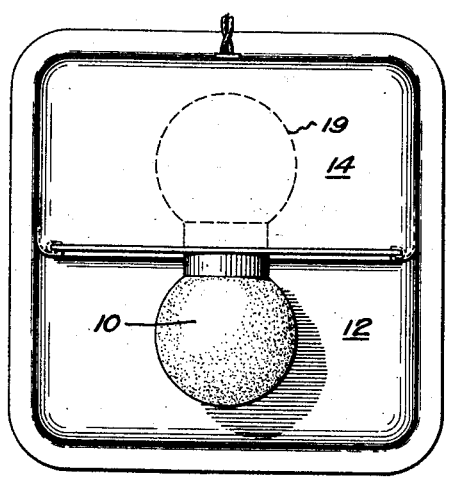
Fig. 3 is a top plan view of the device shown in Fig. 2.

Referring first to that modification of the invention shown in Figs. 1 to 3 inclusive, there is shown an electric lamp 10 of standard construction, preferably of the type which has a frosted or ground glass globe. Lamp 10 may be conveniently mounted as by means of a receptacle 11 which is provided upon the base 12. As an example of advertising matter which may be displayed in conjunction with the illuminating device, I have shown a card 13 having advertising matter printed upon its front surface. This advertising card may be conveniently retained in position by means of the hood 14, which is extended upwardly from the base 12.

In that portion of the card 13 which is directly behind the lamp globe 10, there is provided a window 16 thru which light may be projected from the interior of the hood 14. This window for example may consist merely of a metal tube 17 inserted thru card 13, and preferably contains a transparent or translucent colored screen 18. As a source of light for projection thru the window 16, in that form of the invention shown in Figs. 1 to 3 inclusive, I have shown the use of another electrical lamp 19 which is positioned within the hood 14 directly behind the card 13. Lamp 19 may likewise be removably secured within the electric lamp receptacle 21 supported by the base 12. It will be apparent that light from the lamp 19 will be projected directly thru window 16 and will be diffused thruout the surface of the frosted globe of lamp 10. When the globe of lamp 10 is illuminated by diffusing light from an exterior source, the color of its illumination will of course depend upon the color of screen 18, but when lamp 10 is illuminated by current supplied to the same, it will change to the color of its normal illumination. To obtain a varying color effect in the illumination of the globe of lamp 10, we therefore supply current to the filament of lamp 10 at recurrent intervals.

Figure 5:
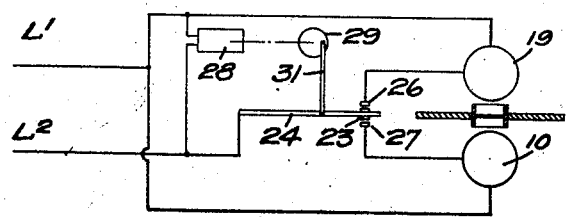
Fig. 5 is a circuit diagram illustrating the manner in which the electrical lamps are energized.

To obtain the most striking effect and in order to consume the smallest amount of current, current is preferably supplied to lamps 10 and 19 alternately so that when lamp 10 is illuminated by its filament, lamp 19 is deenergized. A suitable circuit for obtaining this result is shown in Fig. 5. One terminal of each of lamps 10 and 19 is connected to one of the current supply lines, say line $L_1$, while the other current supply line $L_2$ is connected to the other lamp terminals thru a suitable continuous operating switch 23. This switch for example may comprise the movable switch members 24 cooperating with a pair of relatively stationary contacts 26 and 27. Switch member 24 is connected to line $L_2$ and is adapted to be moved first into contact with switch contact 26 to illuminate lamp 19, and then in contact with switch contact 27 to illuminate lamp 10. For moving switch member 24 we may provide suitable means such as a motor 28 operating a crank or eccentric 29 connected with switch member 24 by link 31. In place of a motor operated switch, it is obvious that we may substitute a thermally operated switch or a bi-metallic circuit interrupter.

To briefly review the operation of the device, if say a red color screen 18 is employed when current is supplied to lamp 10, the globe of this lamp is illuminated in its normal manner to give a whitish light. However when the supply of current is interrupted to lamp 10 and current is supplied to lamp 19, the globe of lamp 10 immediately glows with a reddish color, somewhat like the illumination effect secured by a neon or other gas discharge lamp. The sudden changes in color and characteristics of the illumination produced by the globe of lamp 10 will attract much attention from the public, thus enhancing the advertising value of the card 13.

Figure 4:
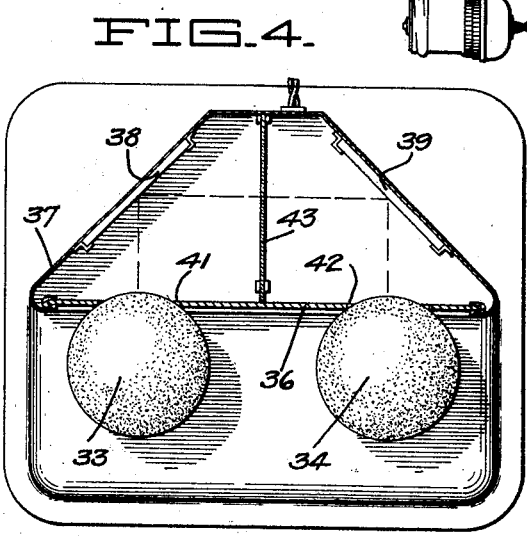
Fig. 4 is a cross sectional view showing a modified form of display device incorporating the invention.

Instead of having only one frosted globe appear outside of the advertising card 13, we may provide two lamps of the same character positioned outside of the card so that the color appears to travel from one lamp globe to the other. For example as shown in Fig. 4 we have provided two electric lamps 33 and 34 having frosted globes, and both being positioned in front of the advertising card 36. The interior of the hood 37,—corresponding to the hood 14 previously described,—is provided with reflecting mirrors 38 and 39 arranged at an angle of substantially 45 degrees with the line of centers of lamps 33 and 34. Windows 41 and 42 are provided in the card 36 so as to expose a portion of each lamp globe to the interior of hood 37. Because of the positioning of mirrors 38 and 39, light projected from one lamp, say lamp 33, is projected into the hood 37, reflected by mirrors 38 and 39, and projected into the lamp globe 34 thru window 42. A suitable color screen 43 is positioned so as to intercept the path of the projected light.

With the arrangement such as shown in Fig. 4, lamp 33 will first be illuminated by diffused light projected from the directly illuminated lamp 34. However when the filament of lamp 33 is directly illuminated, it will project its light into the globe of the deenergized lamp 34, thus causing the color previously seen in globe 33, to travel to the globe of lamp 34. Switch 23 is preferably constructed so that one lamp is illuminated substantially the instant the other lamp is deenergized thus making the traveling color effect more realistic.

We claim:

1. In an illuminating device, an electric lamp having a frosted globe, means for directing colored light from a camouflaged source into said globe to indirectly illuminate the same, and means for recurrently supplying current to said lamp to directly illuminate the same at recurrent intervals whereby the illumination afforded by the lamp globe recurrently changes color.

2. In an illuminating device, a pair of electric lamp globes, one of which is frosted, means for alternately supplying current to said globes to illuminate the same, and means including a colored filter screen for projecting light from one lamp into the globe of the frosted lamp, whereby the frosted lamp globe is alternately illuminated by current supplied to the same and indirectly by colored light projected from the other lamp.

3. In a display device, an electric lamp having a frosted globe, a screen positioned adjacent said globe, a window in said screen serving to expose a portion of said globe to the rear side of the screen, means for projecting light into said globe thru said window whereby the globe is indirectly illuminated to secure a glowing effect, and means for recurrently supplying current to said lamp to directly illuminate the same at recurrent intervals.

4. In a display device, an electric lamp having a frosted globe, a display card positioned adjacent said globe, a window in said card serving to expose a portion of said globe to the rear side of the card, means for projecting light into said globe thru said window whereby the globe is indirectly illuminated to secure a glowing effect, and means for recurrently supplying current to said lamp to directly illuminate the same at recurrent intervals, said lamp when directly illuminated affording an illuminating effect different from said glowing effect.

5. In a display device, a display card, an electric lamp interrupting the surface of the card containing subject matter to be displayed, said lamp having a frosted globe, said card having a window adjacent said globe, another lamp adapted to project light thru said window into the frosted globe to secure a glowing effect from said globe, and means for alternately and successively supplying current to said lamps whereby the frosted globe is alternately illuminated by current supplied to the same and by light projected into its globe from the other lamp, said first lamp when directly illuminated by current supplied to the same affording an illuminating effect different from said glowing effect.

In testimony whereof, we have hereunto set our hands.

MILTON H. SHOENBERG.
LESTER SCHON.